UNITED STATES PATENT OFFICE.

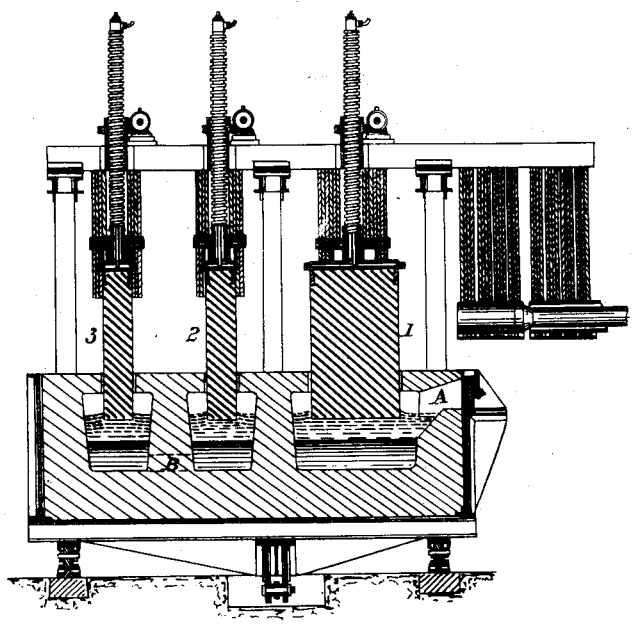
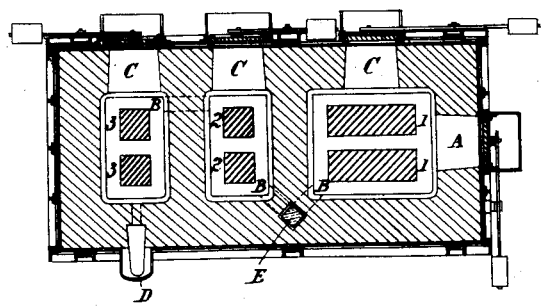

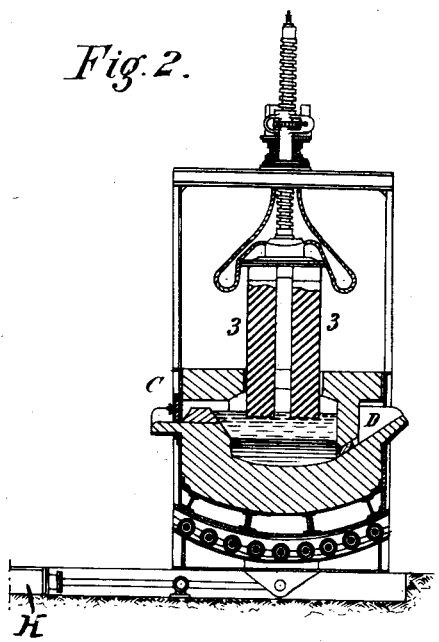
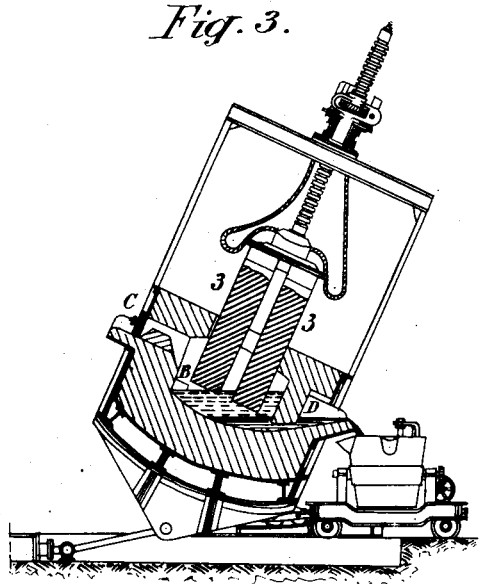

GUSTAVE GIN, OF PARIS, FRANCE.

ELECTRIC FURNACE.

No. 869,432.  Specification of Letters Patent.  Patented Oct. 29, 1907.

Application filed January 25, 1906. Serial No. 297,856.

*To all whom it may concern:*

Be it known that I, GUSTAVE GIN, a citizen of the French Republic, and a resident of 43 Rue de Lévis, Paris, France, have invented certain new and useful Improvements in an Electric Furnace.

The present invention relates to certain new and useful improvements in electric furnaces for use in the manufacture of steel.

In my improved furnace there is effected simultaneously and uninterruptedly the several operations which occur in the production of steel, to wit, fusion, oxidation of impurities, reduction of the dissolved oxid of iron, and carburization.

The accompanying drawing shows a furnace embodying my improvements.

In this drawing F'gure 1 is a central longitudinal sectional view of my improved furnace. Fig. 2 is a cross sectional view of the same. Fig. 3 is a longitudinal section showing the furnace in an inclined position, and Fig. 4 is a horizontal sectional view.

The furnace is essentially composed of three parts: 1st, a crucible 1 for melting and oxidizing; 2nd, a compartment 2 for dioxidizing dissolved oxids and carburization; 3rd, a finishing or refining chamber.

The electrodes of the first compartment are connected to one of the terminals of a source of electricity and the electrodes of the second and third compartments are connected in parallel to the other terminal.

The current passes from the electrodes to the metal through a bath of slag forming superficial resistance and in which the calorific action of the current is produced. The baths or compartments are connected by the passages B whose section is sufficiently reduced to prevent the metal becoming or remaining solid by reason of the Joule effect.

The compartments are provided with linings which are suited to the work of said compartments. The portion of the floor and walls of the oxidation compartment 1 which is always in contact with the metal is constructed of basic or acid material according as the metal to be refined contains or is free from phosphorus, but the part coming in contact with the slag should be composed of neutral material as chromite of iron for example.

In the compartments 2 and 3 magnesia is preferably employed for the floor and surfaces which are not in contact with slag, and chromite of iron for the upper parts.

In order to start the furnace, the liquid steel or iron is introduced through the orifice A and flows into the three compartments; or scrap iron may be placed on the floors of the compartments and pieces of iron inserted in the passages B. The current is then turned on and the substances which, after fusion will form the superficial baths in which the Joule effect is produced, are gradually put in.

The oxidizing bath of compartment 1 is composed of ore or slag rich in oxid of iron, to which lime is added, when the metal to be refined contains phosphorus. The baths of compartments 2 and 3 are neutral and only slightly reducible by carbon. Aluminates of lime and magnesia, obtained by fusion of bauxite with limestone and dolomite give good results, and the addition of fluorspar renders them more fusible and more fluid.

The furnace operates as follows:- In the oxidizing compartment the zone of the most intense heat is naturally close to the surface of contact of the metal with the slag, and it is here that the reduction of the oxids at the expense of the silicon, manganese and carbon of the metal bath takes place. The reaction is more or less rapid according to the proportion of reducible oxids, and manifests itself by an eddying agitation of the bath which stirs up the metal and facilitates oxidation by constantly renewing the surfaces of contact. The oxidizing action is kept up and its intensity and rapidity regulated by a careful introduction of oxid of iron or scales. In consequence of circulation, the metal refined in compartment 1 passes into the compartment 2 where the reduction of the dissolved ferrous oxid and the carburization of the metal takes place. These two operations are effected simply by the introduction of carbon in the form of coke and of fused supercarbureted iron prepared in an electric furnace in the presence of a great excess of carbon. The carburizating required to produce the final composition of the steel takes place in compartment 3, from which samples are taken for tests, the assay of which samples shows the quality of steel obtained and indicates the additions necessary to correct any imperfections observed. The use of manganese or silicospiegel which is obligatory in the Martin furnace before the running off of the metal is in the present case almost wholly unnecessary. In the two last compartments the steel is preserved from all oxidizing action because it is not in contact with the atmosphere, and is only in contact with neutral slag. Besides, this slag under the action of high temperature and of the carbon present, furnishes a small quantity of aluminium which becomes diluted in the steel bath and absorbs the oxygen in no matter what form it may be present. The charging of the solid materials and the expulsion of the surplus slag is effected through the gates C, and the running off of the steel through the tap-hole D which is situated at a certain height above the base. The furnace is held in a metallic frame which is mounted to be tilted or oscillated upon two crowns of rolls which move along guides having concave sections. The tilting may be effected by means of a hydraulic cylinder H arranged to reciprocate a rod secured to the exterior frame of the furnace.

Referring to drawings, it can be readily seen how the furnace may be tilted or inclined for the discharge of the steel or slag. The passage between compartments 2 and 3 is located in such a manner that it will be almost immediately uncovered at the beginning of the discharge so that the metal of compartment 2 will not be able to mix with that of compartment 3 during the operation. When this operation is completed the furnace is tilted in the opposite direction and the metal of compartment 2 will then be able to pass into compartment 3, but the opening between 1 and 2 is uncovered in its turn so that the metal of the oxidation compartment cannot pass into the second compartment. The furnace is then returned to its normal position, and compartment 1 charged with scrap iron or pig iron. At this time the three compartments are on a level, but as the scrap or pig iron is not yet melted, the metal which passes from compartment 1 to compartment 2 has been already refined and contains no other appreciable impurity than the dissolved oxid of iron which disappears during its passage through the two carburization compartments.

It might be apprehended that during the work the impure metal of compartment 1 might mix with the refined metal of compartment 2, but there is no cause for such apprehension because the currents of diffusion in the molten steel in the process are almost exclusively in the form of little vertical whirlings or eddies, whose effects are almost *nil* in a horizontal direction. However to insure perfect results, I have placed between compartments 1 and 2 a vertical chamber which opens into the passage between compartments 1 and 2, and into this I introduce an ingot of steel E, which, while it does not entirely close the passage, will suffice to prevent the mixture of the contents of compartments 1 and 2 so long as the baths remain level. If, however a difference of level occurs, the metal contained in the fullest compartment will merely pass into the one less full and equilibrium will be rapidly restored. Moreover, and this is an important point, the bar E opposes only a slight resistance to the passage of the current. Naturally this bar melts gradually and sinks in the channel so that it must be replaced when necessary by another bar.

It can thus be seen that the successive operations described are independent and may succeed each other in continuous rotation, particularly as the materials retain to all intents and purposes the temperature of reduction, because the capacity of the compartments is such that the volume poured out at each tapping represents only a fraction of the metal present. Furthermore, the metal oxidized in compartment 1 passes on to compartment 2 without carrying with it any trace of slag, which precludes the subsequent incorporation of impurities into the refined metal.

Having described my invention, I claim:

1. An electric furnace comprising three communicating reaction chambers, and provided with outlet apertures for said chambers, one of said chambers having an aperture upon the opposite side of said furnace from the apertures of the opposite end chamber, and means to tilt the furnace to either side of its normal longitudinal axis to discharge material from said chambers, the means of communication between each end chamber and the middle chamber being upon the opposite side of said furnace from the outlet aperture of the associated end chamber, substantially as and for the purpose specified.

2. An electric furnace comprising a plurality of reaction chambers, and provided with a means of communication between two of said chambers, said furnace being further provided with a vertical passage extending downward from the top of said furnace and opening into the said means of communication, a bar of solid steel disposed within said vertical passage and extending within and partially closing the said means of communication between the said chambers, substantially as and for the purpose specified.

In testimony whereof I have hereunto set my hand in presence of two witnesses.

GUSTAVE GIN.

Witnesses:
  LOUIS PETITALOT,
  HANSON C. COXE.